US012687273B2

(12) United States Patent
Taleb et al.

(10) Patent No.: US 12,687,273 B2
(45) Date of Patent: Jul. 21, 2026

(54) LIGHT SYSTEM FOR A MOTOR VEHICLE

(71) Applicant: VALEO VISION, Bobigny (FR)

(72) Inventors: Rabih Taleb, Bobigny (FR); Hafid El Idrissi, Bobigny (FR)

(73) Assignee: Valeo Vision, Bobigny (FR)

( * ) Notice: Subject to any disclaimer, the term of this patent is extended or adjusted under 35 U.S.C. 154(b) by 82 days.

(21) Appl. No.: 18/252,116

(22) PCT Filed: Nov. 17, 2021

(86) PCT No.: PCT/EP2021/082052
    § 371 (c)(1),
    (2) Date: May 8, 2023

(87) PCT Pub. No.: WO2022/106498
    PCT Pub. Date: May 27, 2022

(65) Prior Publication Data
    US 2024/0003511 A1     Jan. 4, 2024

(30) Foreign Application Priority Data

Nov. 18, 2020    (FR) ...................................... 2011843

(51) Int. Cl.
    *H05B 45/10*        (2020.01)
    *B60Q 1/00*         (2006.01)
              (Continued)
(52) U.S. Cl.
    CPC .......... *F21S 41/663* (2018.01); *B60Q 1/0088*
                  (2013.01); *F21S 41/153* (2018.01)
(58) Field of Classification Search
    CPC ...... H05B 45/10; H05B 45/30; H05B 45/325;
              H05B 45/56; F21S 41/10; F21S 41/153;
              (Continued)

(56) References Cited

U.S. PATENT DOCUMENTS 9,295,126 B2    3/2016  Harbers
9,974,135 B1 *  5/2018  Nelson ................... B60Q 1/143
              (Continued)

FOREIGN PATENT DOCUMENTS

CN        102395230 A      3/2012
DE    202020104025 U1     10/2020
              (Continued)

OTHER PUBLICATIONS

European Patent Office, International Search Report (with English translation) and Written Opinion of corresponding International Application No. PCT/EP2021/082052, dated Feb. 10, 2022.
              (Continued)

*Primary Examiner* — Thai Pham
(74) *Attorney, Agent, or Firm* — Valeo Vision

(57)                ABSTRACT

A light system including a first light source, a second light source, a first drive device configured to supply a first pulse-width modulation current for supplying power to the first light source, the first current including a first peak intensity and a first duty cycle, a second drive device configured to supply a second pulse-width modulation current for supplying power to the second light source with the second current comprising a second peak intensity and a second duty cycle, a control module generating a first control signal and a second control signal for the first control device and the second control device. The first peak intensity being lower than the second peak intensity, and the first duty cycle is higher than the second duty cycle.

14 Claims, 4 Drawing Sheets

(51) Int. Cl.

| | |
|---|---|
| *F21S 41/00* | (2018.01) |
| *F21S 41/153* | (2018.01) |
| *F21S 41/663* | (2018.01) |
| *H05B 45/325* | (2020.01) |

(58) Field of Classification Search
CPC ....... F21S 41/663; B60Q 1/04; B60Q 1/0088;
B60Q 3/18
See application file for complete search history.

(56) References Cited

U.S. PATENT DOCUMENTS

| | | | | |
|---|---|---|---|---|
| 10,098,193 B2 * | 10/2018 | Hue | ..................... | H05B 45/325 |
| 10,960,810 B2 | 3/2021 | Waragaya et al. | | |
| 2016/0044757 A1 * | 2/2016 | Koo | ........................ | H05B 45/50 |
| | | | | 315/297 |
| 2018/0242413 A1 * | 8/2018 | Hue | ........................ | H05B 45/10 |
| 2020/0077479 A1 * | 3/2020 | DeJonge | .................. | H03K 7/08 |
| 2023/0164894 A1 * | 5/2023 | Puscasu | ................. | H05B 45/59 |
| | | | | 315/77 |

FOREIGN PATENT DOCUMENTS

| | | | |
|---|---|---|---|
| EP | 3367754 A1 | 8/2018 | |
| FR | 3056071 A1 | 3/2018 | |
| FR | 3059817 A1 | 6/2018 | |
| JP | 2015-510246 A | 4/2015 | |
| JP | 2015149307 A | 8/2015 | |
| JP | 2016164996 A * | 9/2016 | |
| JP | 2019-059265 A | 4/2019 | |
| JP | 2020-009613 A | 1/2020 | |
| JP | 2020-095963 A | 6/2020 | |
| JP | 6773927 B1 | 10/2020 | |
| JP | 2021185853 A | 12/2021 | |

OTHER PUBLICATIONS

Japan Patent Office, Office Action (with English translation) of corresponding Japanese Patent Application No. 2023-530052, dated Jun. 7, 2024.

China Patent Office, Office Action (with English translation) and Search Report of corresponding Chinese Patent Application No. 202180076833.4, dated Sep. 30, 2025, 19 pages.

Japan Patent Office, Decision to Grant a Patent (with English translation) of corresponding Japanese Patent Application No. 2023-530052, dated Nov. 8, 2025, 5 pages.

* cited by examiner

LIGHT SYSTEM FOR A MOTOR VEHICLE

TECHNICAL FIELD

The present invention relates to the field of powering light-emitting modules via supply of a pulse-width-modulated current. More precisely, the invention provides a luminous system with a matrix light source employing electroluminescent semiconductor components forming LEDs (Light-Emitting Diodes).

BACKGROUND OF THE INVENTION

It is becoming increasingly common to use light sources employing semiconductor components, such as light-emitting diodes (LEDs), to perform various vehicle lighting functions. These functions may, for example, include day-time-running lights, position lights, turn indicators or low-beam lights. Use of these small, high-brightness, low-power light sources also allows original luminous shapes to be produced using a compact low-power system. A pixelated light source, typically taking the form of a matrix comprising a high number of individually driven light-emitting diodes, further allows very varied functions to be created: depending on the chosen drive mode, a matrix source may, by way of example, project a shape or graphic onto the road, generate a combination of a high beam (HB) and a low beam (LB), or provide dynamic and directional lights.

As is known, a power-supply control unit is required to supply electrical power to a set of LEDs performing a given lighting function. Such a control unit generally comprises a voltage converter that, on the basis of a DC input voltage delivered by a source that is internal to the vehicle, such as a battery, is capable of generating an output voltage having a value that is suitable for powering the group of LEDs. An LED emits light when a voltage that is at least equal to a threshold value, referred to as forward voltage, is applied to its terminals. Beyond this threshold intensity, the amount of light emitted by an LED is in general dependent on the intensity of the current flowing through it. The LED emits light when it is passed through by a current having an intensity at least equal to a threshold intensity. The brightness of the luminous flux emitted by an LED in general increases with the average intensity of the electric current flowing therethrough, above the threshold current value. Known converters comprise SEPIC converters (SEPIC standing for Single-Ended Primary-Inductor Converter), fly-back converters, boost converters or buck converters. Such converters involve a switching component, such as a transistor, the state of which is periodically switched between the open and closed values. The switching frequency applied to the switch affects the value of the output voltage and the average value of the output current.

It is further known practice to adjust the luminous intensity of light sources powered in this way, by applying, to the switched-mode converter, a PWM signal having a given duty cycle and a given peak intensity (PWM standing for pulse-width-modulated). By adjusting the frequency, duty cycle and peak intensity of the pulse-width-modulated signal, a predetermined average current intensity may thus be obtained from the converter. This implies, as regards the light sources powered, that a brightness of a luminous flux increases proportionally to the intensity the light sources. Such an architecture therefore allows the brightness of the luminous flux emitted by the light sources to be decreased by modifying the parameters of a PWM signal. As the frequency of a PWM signal is generally high, the emitted luminous flux will be pulsed at the same frequency, and the pulses are not perceptible to the human eye. As perception by the human visual system is of integral type, it perceives, compared to a constant and non-pulsed luminous flux, a flux of constant but lower luminous intensity.

The number of LEDs required per headlamp in a motor vehicle is increasing, but the luminous fluxes emitted by each LED still need to be managed individually. This implies that it is necessary to generate a high number of PWM signals. As is known, each PWM signal is generated by a microcontroller component, which is difficult to integrate into the cramped environment of a motor-vehicle headlamp.

To vary luminous flux between the various LEDs requires different supply currents to be generated; which function is performed by the control units. Generally, the headlight is designed so that at least one of its control units operates under optimal conditions. However, these conditions will not necessarily apply to all the control units, and hence one thereof might be penalized and be required to work under sub-optimal conditions. For example, this other control unit will then generate high losses, for example through heating significantly. Moreover, the junction temperature of the semiconductor component impacts the light-emitting performance of an LED, as does thermal aging due to repeated use thereof. In a luminous system, thermal management is therefore a factor that must be taken into account in order to preserve service life and the quality of the emitted luminous flux.

SUMMARY OF THE INVENTION

One aim of the invention is to mitigate at least one of the problems of the prior art. More precisely, the objective of the invention is to increase the service life of a luminous system.

According to a first aspect of the invention, a motor-vehicle luminous system is provided, this luminous system comprising: a first light source; a second light source; a first control unit configured to supply a first pulse-width-modulated current to power the first light source, said first current having a first peak intensity and a first duty cycle; noteworthy in that the luminous system further comprises a second control unit configured to supply a second pulse-width-modulated current to power the second light source, said second current having a second peak intensity and a second duty cycle; a driver for controlling the first control unit and second control unit, the luminous system being configured so that the first peak intensity is greater than the second peak intensity, and so that the first duty cycle is lower than the second duty cycle.

Preferably, the luminous system is configured so that the first current has a first average intensity, and the second current has a second average intensity less than or equal to the first average intensity.

Preferably, the luminous system is configured so that the first light source generates a first luminous flux, and so that the second light source generates a second luminous flux less than or equal to the first luminous flux.

Preferably, the luminous system further comprises a driver configured so as to control the first control unit and the second control unit by transmitting a first signal to the first control unit and a second signal to the second control unit, each of said first signal and second signal comprising at least one pulse-width-modulated signal. Further, the driver defines the first and second signals depending on an available margin of correction of the pulse-width-modulated signal of the first light source and of the second light source.

In the present document, by margin of correction what is meant is the difference between the value of the pulse-width-modulated signal of the light source in question and a threshold value of the pulse-width-modulated signal. The threshold value may be the maximum value or a predefined value of the pulse-width-modulated signal. The threshold value is for example stored in the driver.

Preferably, the luminous system comprises a matrix light source comprising a plurality of elementary light sources divided into at least two sets, the first light source and the second light source each forming one elementary light source of said matrix light source and belonging to two different sets.

In this case, and in particular in one example of operation, the luminous system modifies only the control signal sent to the set for which the margin of correction is available. As for the other set, for which there is no possible margin of correction, for example when the value of the pulse-width-modulated signal of the source is almost equal to or slightly lower than the threshold value, the control signal remains the same. In another example, the other set may have a lower margin of correction than the first set.

In this way, the luminous system guarantees that none of the control units operates under sub-optimal conditions due to high thermal losses. Furthermore, the driver is not stressed any more than required. The provided luminous system thus allows optimal operation of its components, and in particular of the driver and of the control units, while decreasing thermal dissipation by virtue of the longer on time of the light source.

According to another aspect of the invention, a motor-vehicle luminous system is provided, this luminous system comprising: a first light source; a first control unit of the first light source; a driver for controlling the first control unit, noteworthy in that the driver is configured so as to selectively transmit: a first control signal to the first control unit so that it supplies a first pulse-width-modulated current, said first current having a first peak intensity and a first duty cycle; and a second control signal to the first control unit so that it supplies a second pulse-width-modulated current, said second current having a second peak intensity and a second duty cycle; the luminous system being configured so that the first peak intensity is greater than the second peak intensity, and so that the first duty cycle is lower than the second duty cycle.

Preferably, the first current has a first average intensity, and the second current has a second average intensity equal to the first average intensity.

Preferably, the luminous system is configured so that with the first control signal the first light source generates a first luminous flux, and with the second control signal the first light source generates a second luminous flux equal to the first luminous flux.

Preferably, the driver is configured so as to change between the first signal and the second signal when the first duty cycle or second duty cycle reaches a threshold value.

Preferably, the luminous system comprises a matrix light source composed of a plurality of elementary light sources, the first light source forming one elementary light source of said matrix light source.

Preferably, the driver defines the second control signal depending on the available margin of correction of the first duty cycle of each of the elementary light sources of the matrix light source, said available margin of correction being the difference between the threshold value and the value of the first duty cycle of each of the elementary light sources.

A search for the available margin is particularly suitable for automobile lighting in which the light sources emit different luminous intensities depending on their position in the matrix of the light sources. Consequently, the duty-cycle margin is different from one elementary light source to another. Generally, when the matrix is driven by a single control unit, the lowest margin is chosen in order to apply its ratio to the peak intensity and to the duty cycle of all the light sources with a single signal. In this way, all the light sources may have their on time prolonged in order to decrease heat dissipation in the luminous system. Furthermore, the chosen margin makes it possible for the driver to drive using reasonable values, this guaranteeing optimal and durable operation of this component. The same goes for the first control unit.

Preferably, the first peak intensity is greater than or equal to twice the second peak intensity; and the second duty cycle is greater than or equal to twice the first duty cycle.

Preferably, the second duty cycle is comprised between 50% and 100% inclusive of limits.

Preferably, the luminous system further comprises a third light source and a fourth light source, the first light source being arranged between the third and fourth light sources, the first to the fourth light source emitting a gradation of luminous intensities.

Preferably, the luminous system comprises a matrix light source, the first light source forming one elementary light source of said matrix light source.

Preferably, the first light source employs electroluminescent semiconductor components, the first light source preferably being a light-emitting diode.

Preferably, the first current and the second current have equal frequencies.

Preferably, the first current has a first pulse width, and the second current has a second pulse width greater than the first pulse width.

Preferably, the first control unit is configured so as to supply a third pulse-width-modulated current with a third average intensity, and the second control unit is configured so as to supply a fourth pulse-width-modulated current with a fourth average intensity.

Preferably, the luminous system further comprises a third light source powered by the first control unit.

Preferably, the first peak current and the second peak current have the same frequency.

Preferably, the driver comprises a microcontroller component or a computer.

According to another aspect of the invention, a motor-vehicle lighting device is provided, said lighting device comprising a luminous system, noteworthy in that the luminous system is according to the invention, and in that the lighting device comprises cooling means that interact thermally with the first light source.

The invention allows the temperature of a luminous system to be decreased. The drop in temperature is observed for a given control unit when the latter is driving a lower luminous intensity than another control unit, or when it is driving a variable luminous intensity lower than a threshold value. The invention tends to decrease the peak intensity of the control unit in question, and to compensate for it by increasing the duty cycle so as to respect a light-emission setpoint. The invention reduces the OFF phases of the control unit, and decreases intensity, intensity being responsible for losses due to Joule heating. The invention therefore generates synergy while maintaining lighting quality. The decrease in temperature prolongs the service life of the light source, and of any heat-sensitive component nearby. Thermal management becomes less constraining, because the most critical episodes are avoided.

BRIEF DESCRIPTION OF DRAWINGS

The Other features and advantages of the present invention will be better understood from the description of examples, and from the drawings, in which.

DETAILED DESCRIPTION OF THE INVENTION

Unless specified otherwise, technical features described in detail with respect to a given embodiment may be combined with the technical features described in the context of other embodiments described by way of example and non-limitingly. In the various embodiments of the invention, similar reference numbers will be used to designate similar concepts. The reference numbers of the second embodiment correspond to those of the first embodiment, incremented by 100.

The description concentrates on features that differentiate the system or method from those known in the prior art. How matrix light sources or light-emitting diodes operate or are manufactured will not be described in detail since it is known per se in the prior art. For example, it is known to produce matrices comprising hundreds or thousands of micro-LEDs, or indeed to manufacture a monolithic pixelated source by forming the electroluminescent semiconductor components during a common layer-deposition process.

The expression brightness should be understood to mean luminous intensity.

Figure 1:
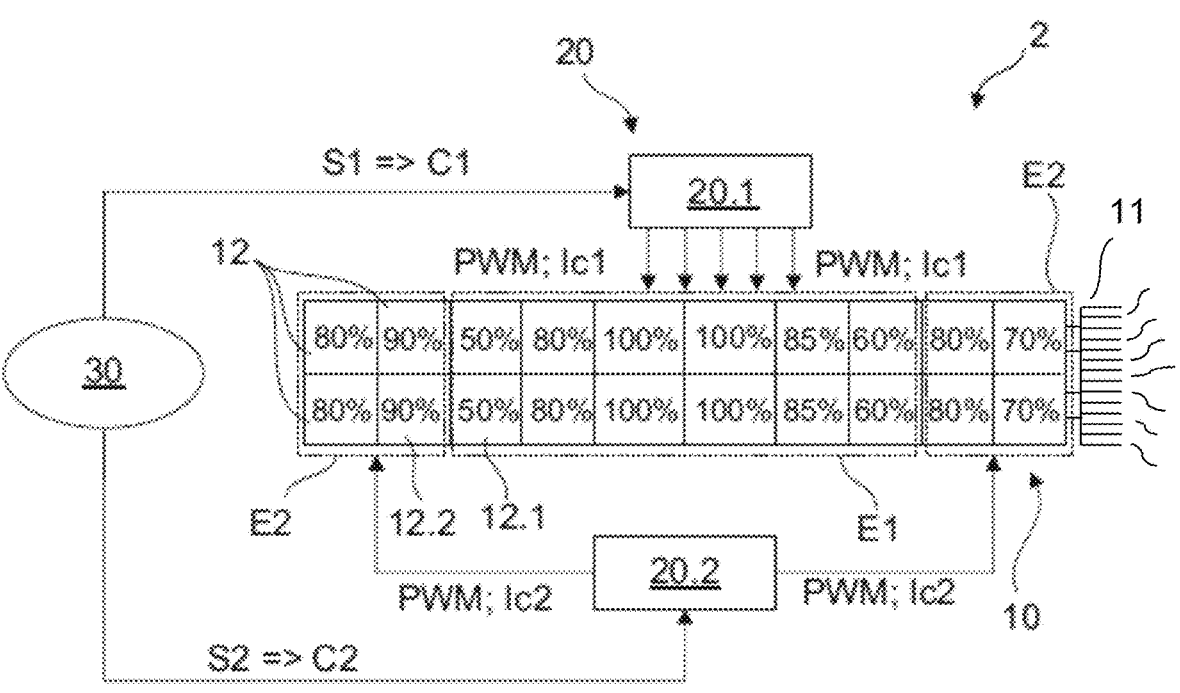
FIG. 1 shows a luminous system according to a first embodiment of the invention.

The illustration of FIG. 1 shows a luminous system 2 according to a first embodiment of the invention. A motor vehicle (not shown) may be equipped with the luminous system 2. It may be arranged in the passenger compartment, or indeed on the exterior where it may perform a regulatory signaling and/or lighting function. It may be in a headlamp.

The luminous system 2 comprises a matrix light source 10. The matrix light source 10 comprises an electroluminescent semiconductor component, forming a plurality of elementary light sources 12. The elementary light sources 12 employ electroluminescent semiconductor elements. The elementary light sources 12 may be light-emitting diodes. In the present example, the matrix light source 10 comprises twenty elementary light sources 12; however, the invention is applicable to matrix light sources 10 comprising more thereof. For example, the matrix light source 10 may comprise at least thirty elementary light sources 12, and optionally at least one thousand elementary light sources 12. In the present illustration, the elementary light sources 12 are arranged in two rows. However, the invention covers other arrangements, other grids. The elementary light sources may form a square or a ring for example.

Each elementary light source 12 is associated with one duty-cycle value, which may vary from 0% to 100%. In the present embodiment, certain elementary light sources 12 have equal duty-cycle values. The elementary light sources 12 may form a plurality of sets (E1; E2), including a first set E1 and a second set E2. The first set E1 may intersect the second set E2. The first set may be a center set, and the second set may be an edge set or an end set. Optionally, the duty-cycle values vary gradually within each set (E1; E2). This makes it possible to create a luminous gradation.

For the sake of clarity of the explanations, a first light source 12.1 will be selected from the first set E1; and a second light source 12.2 will be selected from the second set E2. By way of illustration, the first light source 12.1 generates a first luminous flux greater than the luminous flux, called the second luminous flux, generated by the second light source 12.2. Optionally, this pair of light sources (12.1; 12.2) forms a pair of adjoining sources. This pair may straddle the first set E1 and the second set E2.

The luminous system 2 comprises driving means 20, including a first control unit 20.1 and a second control unit 20.2. More generally, the piloting means 20 may comprise a plurality of control units (20.1; 20.2). Each control unit (20.1; 20.2) may be associated with at least one elementary light source 12, and optionally with a plurality of elementary light sources 12, optionally from the same set (E1; E2) such as defined above.

Each control unit (20.1; 20.2) is configured so as to generate a supply current, or optionally a plurality of supply currents, to power the elementary light source 12. These supply currents are pulse-width-modulated. Each control unit (20.1; 20.2) may comprise a DC/DC converter. The DC/DC converter may be a buck, boost, SEPIC or flyback converter, i.e. a switch-mode power supply that converts a DC voltage into another DC voltage of lower value or of higher value. It essentially comprises an inductor (single, dual, transformer, etc.), a switch and a diode. When the switch is closed, the current generated by the input voltage flows through the inductor and increases linearly. Other converters are conceivable.

The luminous system 2 further comprises a driver 30. The driver 30 may be associated with a plurality of matrix light sources, and for example with a plurality of luminous systems of the same vehicle. The driver 30 is configured so as to control the control units (20.1; 20.2). The driver 30 supplies at least one pulse-width-modulated signal, PWM, having a duty cycle less than or equal to 100%, said signal being applied to one of the control units (20.1; 20.2). In the present embodiment, the driver 30 transmits a first signal S1 to the first control unit 20.1; and a second signal S2 to the second control unit 20.2. These signals contain the information required for each elementary light source 12 to generate, and respect, a dedicated luminous-flux setpoint. Thus, each signal (S1; S2) allows the associated control unit (20.1; 20.2) to supply its elementary light sources using a current defined by a peak intensity (Ic1; Ic2). The driver 30 may take the form of a microcontroller component. Alternatively, it may take the form of a field-programmable gate array (FPGA). Preferably, the driver may take the form of a computer. The computer may preferably be a programmable computer, programmed by a suitable programming code to carry out the method according to one aspect of the invention. The driver 30 is supplied with electric current by an internal current source of the associated vehicle. The driver 30 is configured to generate primary control signals on its data output. Furthermore, it generates periodic pulsed signals on its clock output. The driver 30 may be integrated into a control unit.

It is interesting to note that each control unit (20.1; 20.2) may supply a current of the same peak intensity (Ic1; Ic2), while the duty cycles that it supplies to the elementary light sources 12 vary. By this means, a given control unit is able to modulate the luminous intensity of the elementary light sources 12 which depend on it.

The first control unit 20.1, by virtue of the first signal S1, supplies a first current C1 the first peak intensity Ic1 of which is greater than the second peak intensity Ic2 of the second current C2 generated by the second control unit 20.2. For example, the first peak intensity Id 1 is greater than or equal to twice the second peak intensity Ic2. Although a first elementary light source 12 connected to the first control unit 20.1 generates a first luminous flux greater than a second luminous flux of a second elementary light source 12; their luminous flux may be relatively close. The difference in luminous intensity is compensated for via their PWM duty cycles.

By this means, the peak intensity Ic2 generated by the second control unit 20.2 is lower than the first. By virtue of this adjustment of peak intensity Ic2, the second control unit Ic2 heats up less. Specifically, there are fewer phases in which the second light source is off. The phases in which the second control unit 20.2 dissipates energy are shortened. The distribution between time under power and dissipation time is optimized as regards the second control unit 20.2. The entire luminous system 2 heats up less. Therefore the driver 30 adjusts the power supply, and reduces the heating undergone by the elementary light sources 12. Their temperature is lowered by several degrees. Their service life increases, as does their reliability. Their emitted color remains within the tolerance range. The decrease in the peak intensity Ic2 has no impact on luminous flux as a result of the compensation associated with the increase in duty cycle.

The luminous system may be mounted in a lighting device of a motor vehicle (not shown). The lighting device advantageously comprises cooling means capable of cooling the matrix light source, and in particular the first source and the second source. The cooling means may comprise a heat exchanger 11, for example a finned heat exchanger.

The first embodiment allows static power supply with localized correction of peak intensity and duty cycles.

Figure 2:
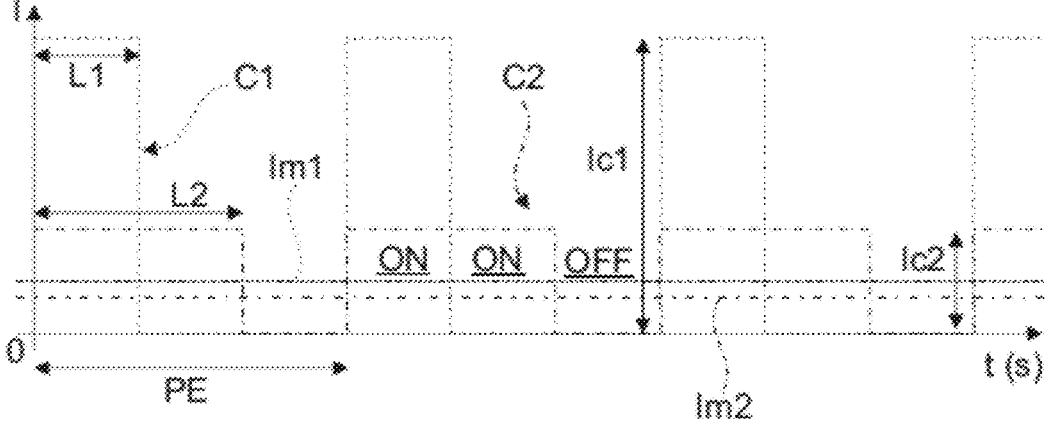
FIG. 2 shows a first current and a second current for a luminous system according to the first embodiment of the invention.

The illustration of FIG. 2 shows a first current C1 and a second current C2 intended to be supplied to a luminous system according to a first embodiment of the invention. The luminous system may be similar or identical to that of FIG. 1.

The first current C1, plotted with dotted lines, is defined by a first peak intensity Ic1, a first average intensity Im1, and a first duty cycle. In this case, the first duty cycle is 33%. The first duty cycle corresponds to the first width L1 of the first pulses, divided by the period PE between two rising edges of consecutive pulses of the first current C1. The period PE is in particular the inverse of the frequency. On this subject, it is interesting to note that the first current and the second current have the same frequency, for example 10,000 Hz. Their pulses may be synchronized or alternately staggered. The average intensity Im1 corresponds to the area of the first pulses. It may be computed using an integral.

The second current C2, plotted with dot-dashed lines; with alternating dots and dashes; is defined by a second peak intensity Ic2, a second average intensity Im2, and a second duty cycle. Here, the second duty cycle is equal to 66%.

The intensity of the brightness emitted by a light source depends on the average intensity (Im1; Im2) of the load current passing through it. The switching frequency applied to the converter circuit governs this intensity. Thus, by using a PWM control signal (PWM standing for pulse-width-modulated), a luminous setpoint of a given value may be achieved. Specifically, the duty cycle of a PWM control signal, i.e., the duration of an ON phase (L1; L2) with respect to the duration of an entire period PE of the signal (ON and OFF), has a direct impact on the average value (Im1; Im2) of the intensity of the load current intended to power the light source.

As may be seen in the present figure, the first peak intensity Ic1 is greater than the second peak intensity Ic2. The value Id 1 may be greater than or equal to twice the value Ic2. By way of illustration, Ic1 may be 500 mA, and Ic2 may be 200 mA. Other values may be chosen. The first duty cycle is lower than the second duty cycle, for example at least twice as small. It may also be seen from the present figure that the first average intensity Im1 exceeds the second average intensity Im2. Thus, for identical or similar elementary light sources, the first current C1 makes it possible to generate more powerful lighting than the second current C2. However, the average currents (Im1; Im2) are close. Therefore, the luminous intensities also remain close despite the substantial distance between the peak intensity's. The second control unit heats up less, in particular during the phases "OFF" in which power is cut. It will be recalled that, when a control unit receives power and this power is not supplied to a light source, it must dissipate this power. Therefore, reducing dead phases "OFF" by increasing duty cycle limits heating. Periods in which the control unit acts as a dissipater are shorter.

Figure 3:
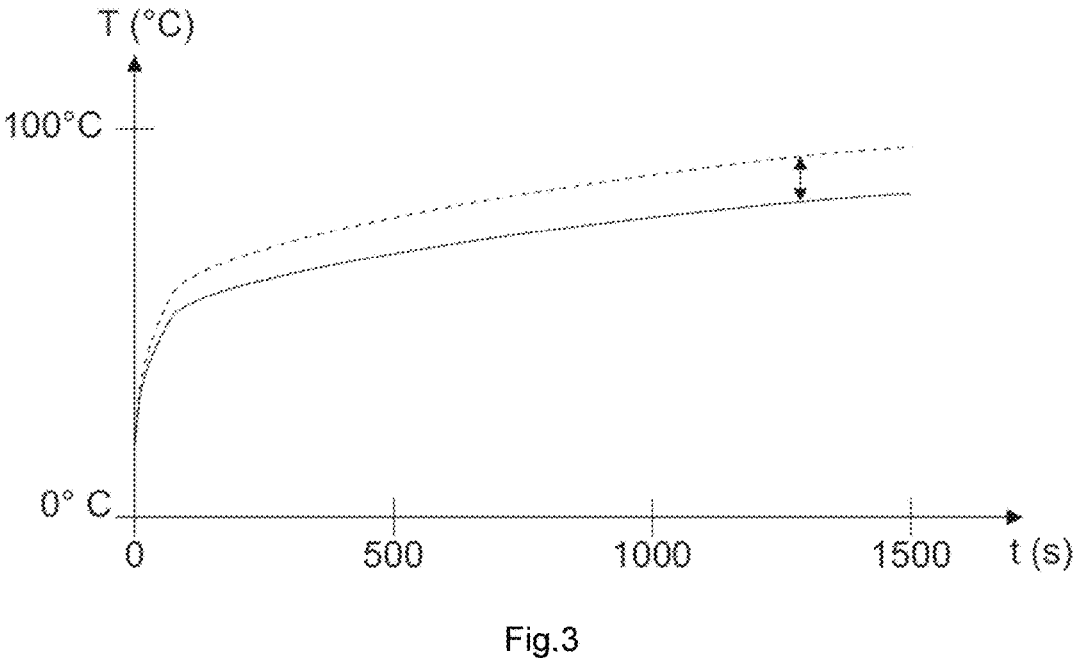
FIG. 3 shows the temperature variation of a luminous system according to one embodiment of the invention.

The illustration in FIG. 3 shows the rise in temperature of a luminous system when it is powered by a second current, for example such as described with reference to FIG. 2. The luminous system may be identical or similar to that described with reference to FIG. 1. Temperature may be measured in the matrix light source, and/or in a control unit.

The solid curve shows temperature for a luminous system a second light source of which has had its peak intensity rectified, i.e. lowered, as detailed above. By way of reference, the dotted curve illustrates the temperature variation without adjustment of the second current, as it would be if the second light source were supplied with the first current. Heating was analyzed over times of the order of 1000 seconds, and preferably of 1500 seconds.

The invention makes it possible to significantly decrease maximum temperature. In certain matrix light sources, the temperature drop is comprised between 2° C. and 10° C. Certain configurations achieve a temperature drop of at least 6° C.

By this means, the service life of the matrix light sources is prolonged. The need for cooling devices is decreased.

Figure 4:
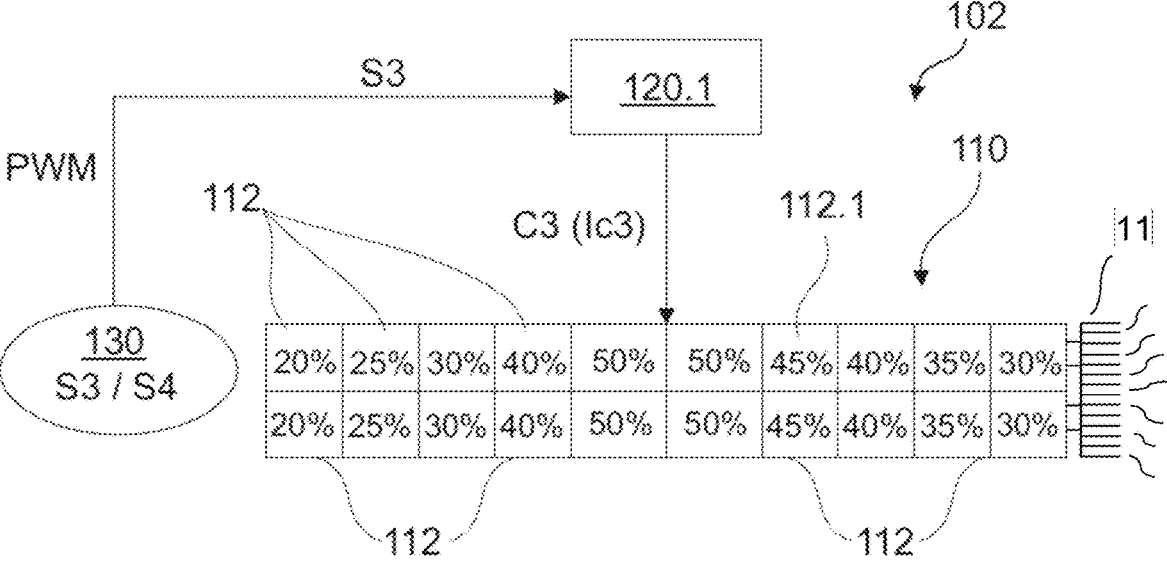
FIG. 4 shows a luminous system in a first configuration according to a second embodiment of the invention.

The illustration of FIG. 4 shows a luminous system 102 according to a second embodiment of the invention, in a first configuration.

The luminous system 102 is similar to that of the first embodiment; however, it differs therefrom in that it has a first control unit 120.1 that selectively receives a first signal S3 and a second signal S4 generated by the driver 130. The driver 130 supplies at least one pulse-width-modulated signal, PWM, having a duty cycle less than or equal to 100%. The first signal S3 and the second signal S4 act in turn on the supply of the same matrix light source 110, for example the first light source 112.1.

In a first mode of operation directed by the first signal S3, or first configuration, the light sources 112 receive a first peak intensity Ic3. This peak intensity may be a reference peak intensity. In parallel, the power supply to the light sources is controlled using first duty cycles. As may be seen in the present figure, these duty cycles are comprised between 20% and 50%. They are essentially considered low, while the first peak intensity Ic3 is considered high. This situation is then balanced, as described below.

Figure 5:
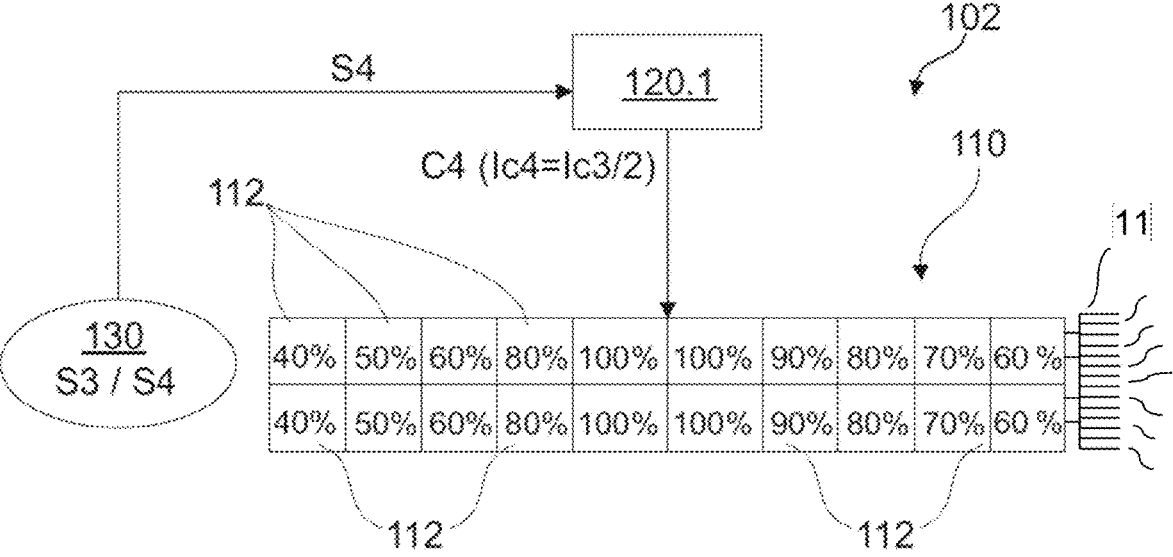
FIG. 5 shows a luminous system in a second configuration according to the second embodiment of the invention.

The illustration of FIG. 5 shows a luminous system 102 according to the second embodiment of the invention, in a second configuration that is specific thereto.

The luminous system 102 here has its supply switched. In particular, the light sources 112 see their duty cycles increase, while the peak intensity Ic4 applied to them decreases. With respect to the initial configuration, the second duty cycles are multiplied by two, while their peak intensity is divided by two. Thus, the second peak intensity Ic4 is equal to half of the first peak intensity Ic3 received in the first configuration. The increase in duty cycle compensates for the drop in peak intensity. The second average intensity remains constant.

One after the other, the first signal S3 and the second signal S4 allow the matrix light source 110, and in particular its elementary light sources 112, to be powered. Each elementary light source 112 is associated with two duty cycles depending on the configuration adopted.

The transition making it possible to switch from the first current to the second current is initiated when the first duty cycle reaches a threshold value, 50% for example. In particular, when the first duty cycle is less than or equal to 50%, it becomes relevant to increase it. Specifically, the pulses have zero power more than half the time. For example, the second duty cycle may tend toward 100% following a correction. In return, the first peak intensity needs to be reduced. The second duty cycle compensates for the second peak intensity. The second duty cycle may be modified so as to vary from 50% to 100%, and preferably from 80% to 100%, inclusive of limits. In a configuration in which a duty cycle is less than or equal to 66%, the invention aims to correct it by multiplying it by 1.5 and dividing the peak intensity by 1.5. Thus, the invention may employ various correction coefficients, and act when various duty-cycle thresholds are reached.

Thus, the invention tends to ensure that at least one duty cycle remains within a range of duty cycles, and/or that the peak intensity of a given light source is minimized.

The second embodiment provides a power supply with dynamic correction of peak intensity and duty cycles.

Figure 6:
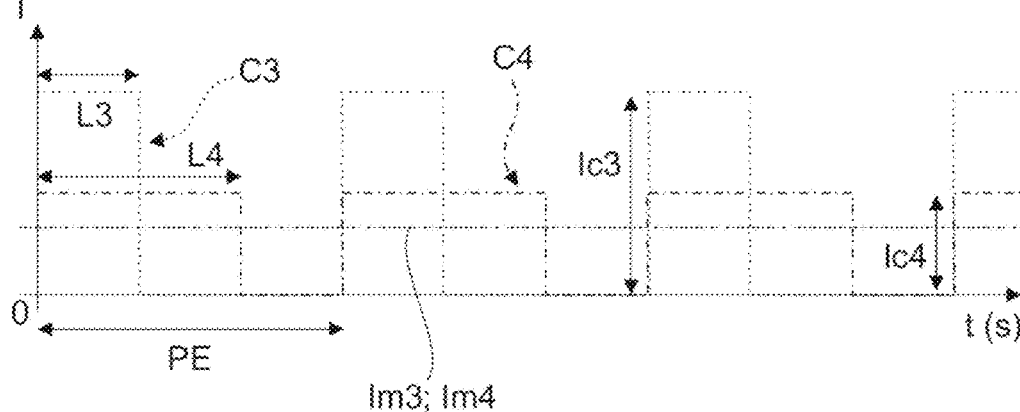
FIG. 6 shows a first current and a second current for a luminous system according to the second embodiment of the invention.

The illustration of FIG. 6 shows a first current C3 and a second current C4 intended to be supplied to a luminous system according to a second embodiment of the invention. The luminous system may be similar or identical to that shown in FIGS. 4 and 5.

This figure is substantially identical to FIG. 2. However, it differs therefrom in that the first average intensity Im3 is equal to the second average intensity Im4.

This result is achieved by compensating for the decrease in the second peak intensity Ic4 by a precise increase in the second duty cycle. In particular, the same coefficient is used to divide the second peak intensity Ic4 and to multiply the second duty cycle. More concretely, the second width L4 is equal to the first width L3 multiplied by the same coefficient. The first pulses have an area equal to the second pulses of the second current C4. In the present example, this adjustment coefficient, or compensation coefficient, is equal to 2. The first current C3 and the second current C4 have an identical period PE. By virtue of the second current C4, it is possible to reduce the temperature of the luminous system, and in particular of the second control unit, as described with reference to FIG. 3. This result is achieved because light source on time is longer, and hence time for which the dedicated control unit is required to dissipate power is shortened.

Figure 7:
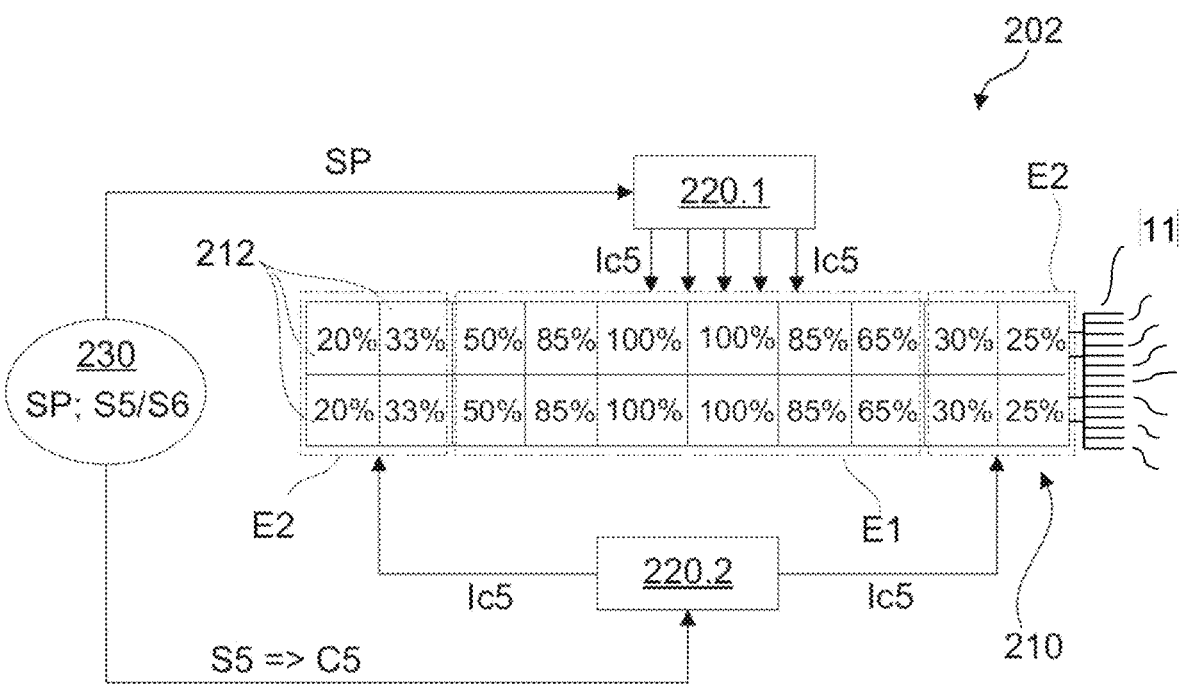
FIG. 7 shows a luminous system in a first configuration according to a third embodiment of the invention.

The illustration of FIG. 7 shows a luminous system 202 according to a third embodiment of the invention, in a first associated configuration.

The present teaching is similar to that of FIG. 1. The luminous system 202 comprises a matrix light source 210 with a plurality of elementary light sources 212 which are divided into a first set E1 and a second set E2. The first set E1 depends on the first control unit 220.1, and the second set E2 depends on the second control unit 220.2. These devices (220.1; 220.2) depend on the driver 230, which transmits dedicated signals (S5; S6; SP) to them.

In this first configuration, the driver 230 delivers a primary signal SP. The light sources 212 of the first set E1 are then powered by a primary pulse-width-modulated current. This primary current is defined by a first peak intensity Ic5 and by first duty cycles. These first duty cycles vary from 50% to 100%.

By virtue of a first signal S5 from the driver 230, the light sources 212 of the second set E2 are powered by a first pulse-width-modulated current C5. This current C5 is defined by a peak intensity Ic5 equal to the first peak intensity Ic5, and by duty cycles. These duty cycles range from 20% to 33%. They are therefore very far from 100%, this leaving a margin of correction as described below.

Figure 8:
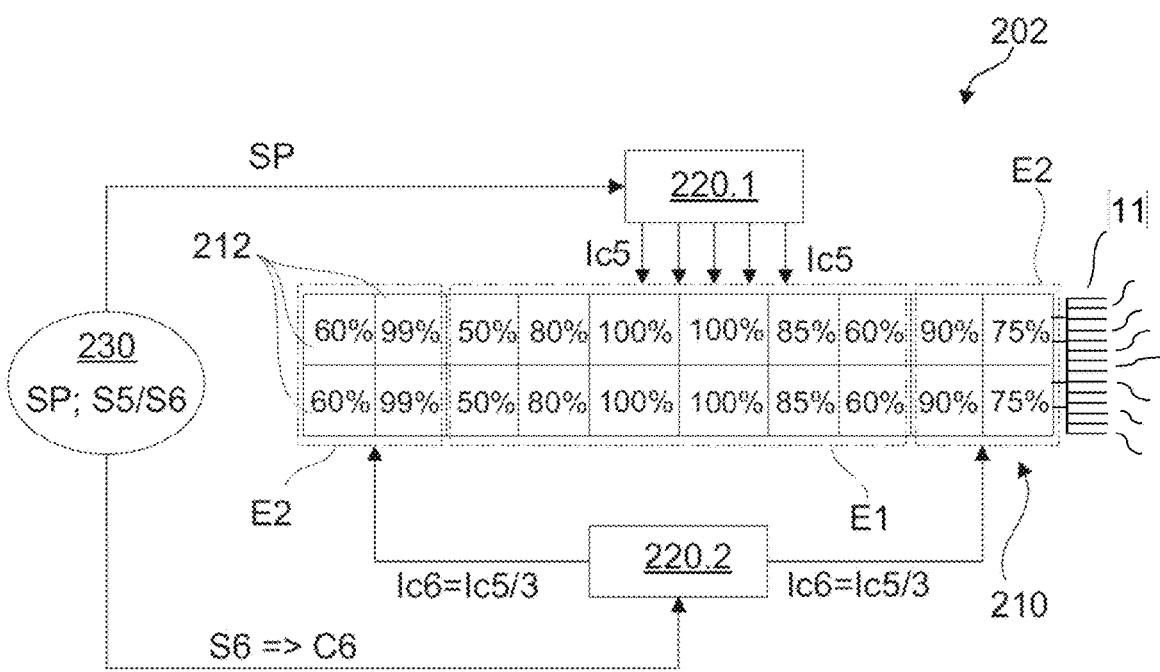
FIG. 8 shows a luminous system in a second configuration according to the third embodiment of the invention.

The illustration of FIG. 8 shows the luminous system 202 according to the third embodiment of the invention, in a second associated configuration.

In order to exploit the margin of correction of the second set E2, the driver 230 supplies a second signal S6, possibly replacing the auxiliary first signal S5. The second signal S6 makes it possible to generate a second pulse-width-modulated current C6. This second current C6 is defined by a second peak intensity Ic6, and by second duty cycles. With respect to the first configuration, the duty cycles of the second set are tripled. They vary from 60% to 99%, inclusive of limits. This makes it possible to approach 100%, and therefore to exploit the available margin of correction. The second peak intensity Ic6 is equal to one third of the first peak intensity Ic5 applied to the first set E1 of the light source 212. This implies a division by three of the peak intensity with respect to the first configuration. By way of comparison, the power supply of the elementary sources of the first zone is not changed—they continue to be powered by the first current C5 controlled by the first signal S5. Therefore the driver 230 selectively supplies the second signal S6 or the first signal S5, in addition to the primary signal SP.

According to one variant of the invention, when peak intensity is switched within the second set E2, the duty cycles change accordingly. Voltage remains constant.

The third embodiment allows power supply with dynamic and localized correction of peak intensity and duty cycles in the second set. The third embodiment offers hybrid operation.

The various embodiments may be combined with one another. For example, the first set of FIGS. 1, 7 and 8 may be modified according to the teaching of FIGS. 4 and 5, provided that the duty cycles allow it. In the context of FIGS. 7 and 8, it will be understood that the second control unit acts like the first control unit of the second embodiment of FIGS. 4 and 5.

The scope of protection is defined by the claims.

What is claimed is:

1. A luminous system for an automotive vehicle comprising:

a first light source; a second light source;

a first control unit configured to supply a first pulse-width-modulated (PWM) current to power the first light source, the first PWM current having a first peak intensity and a first duty cycle;

a second control unit configured to supply a second pulse-width-modulated current to power the second light source, the second PWM current having a second peak intensity and a second duty cycle;

a driver for controlling the first control unit and second control unit, wherein a first PWM control signal transmits to the first control unit and supplies the first PWM current; and wherein a second PWM control signal transmits to the second control unit and supplies the second PWM current;

wherein each PWM control signal allows each associated control unit to supply the first and the second light sources using current defined by the first peak intensity and the second peak intensity;

with the luminous system being configured so that the first peak intensity is greater than the second peak intensity such that the first duty cycle is lower than the second duty cycle.

2. The luminous system as claimed in claim 1, wherein the luminous system is configured so that the first PWM current has a first average intensity, and the second PWM current has a second average intensity less than or equal to the first average intensity.

3. The luminous system as claimed in claim 1, wherein the luminous system is configured so that the first light source generates a first luminous flux, and the second light source generates a second luminous flux less than or equal to the first luminous flux.

4. The luminous system of claim 1, wherein the driver is configured so as to control the first control unit and the second control unit by transmitting a first PWM control signal to the first control unit and a second PWM control signal to the second control unit;

each of the first PWM control signal and second PWM control signal including the driver that defines the first PWM and the second PWM control signals depending on an available margin of correction for each of the first and the second light sources, wherein the available margin of correction is the difference between the value of a respective PWM control signal of an associated light source and a threshold value of the respective PWM control signal.

5. The luminous system as claimed in claim 1, further comprising a matrix light source that includes a plurality of elementary light sources divided into at least two sets, with the first light source and the second light source each forming one of the plurality of elementary light sources of the matrix light source and belonging to two different sets.

6. The luminous system of claim 1, further including a third light source and a fourth light source, the first light source being arranged between the third and fourth light sources, the first to the fourth light source emitting a gradation of luminous intensities.

7. A luminous system for automotive vehicle comprising:

a first light source that is a matrix light source composed of a plurality of elementary light sources;

a first control unit of the first light source;

a driver for controlling the first control unit, with the driver being configured so as to selectively transmit:

a first control signal to the first control unit so that it supplies a first pulse-width-modulated (PWM) current, the first PWM current having a first peak intensity and a first duty cycle; and a second control signal to the first control unit so that it supplies a second pulse-width-modulated (PWM) current, the second PWM current having a second peak intensity and a second duty cycle;

with the luminous system being configured so that the first peak intensity is greater than the second peak intensity, and such that the first duty cycle is lower than the second duty cycle.

8. The luminous system of claim 7, wherein the first PWM current has a first average intensity, and the second PWM current has a second average intensity equal to the first average intensity.

9. The luminous system as claimed in claim 7, wherein the luminous system is configured so that with the first control signal the first light source generates a first luminous flux, and with the second control signal the first light source generates a second luminous flux equal to the first luminous flux.

10. The luminous system of claim 7, wherein the driver is configured to change between the first control signal and the second control signal when the first duty cycle or second duty cycle reaches a threshold value, wherein the threshold value is the maximum value or a predefined value of an associated PWM control signal.

11. The luminous system of claim 7, wherein the first light source forms one of the plurality of elementary light sources of the matrix light source.

12. The luminous system of claim 11, wherein the driver defines the second control signal depending on an available margin of correction of the first duty cycle of each of the plurality of elementary light sources of the matrix light source;

the available margin of correction being the difference between a threshold value and value of the first duty cycle of each of the plurality of elementary light sources;

wherein the threshold value is a maximum value or a predefined value of an associated PWM control signal; and wherein the available margin of correction is a difference between the threshold value and a value of the first duty cycle of each of the plurality of elementary light sources.

13. The luminous system as claimed in claim 7, wherein the first peak intensity is greater than or equal to twice the second peak intensity; and the second duty cycle is greater than or equal to twice the first duty cycle.

14. A lighting device for automotive vehicle, comprising:

a luminous system, including:

a first light source; a second light source;

a first control unit configured to supply a first pulse-width-modulated (PWM) current to power the first light source, the first PWM current having a first peak intensity and a first duty cycle;

a second control unit configured to supply a second pulse-width-modulated (PWM) current to power the second light source, the second PWM current having
a second peak intensity and a second duty cycle;

a driver for controlling the first control unit and second
control unit;

wherein a first PWM control signal transmits to the first
control unit and supplies the first PWM current;

wherein a second PWM control signal transmits to the
second control unit and supplies the second PWM
current;

wherein each PWM control signal allows each associ-
ated control unit to supply the first and the second
light sources using current defined by the first peak
intensity and the second peak intensity:

with the luminous system being configured so that the
first peak intensity is greater than the second peak
intensity such that the first duty cycle is lower than
the second duty cycle; and a cooling means or a finned heat exchanger that inter-
acts thermally with the first light source.

* * * * *